Dec. 27, 1960     S. B. WHITTIER     2,966,102
CAMERA SHUTTER MECHANISM
Original Filed Oct. 27, 1953     8 Sheets-Sheet 1

FIG. 1

INVENTOR
Sidney B. Whittier
BY Brown and Mikulka
ATTORNEYS

Dec. 27, 1960 S. B. WHITTIER 2,966,102
CAMERA SHUTTER MECHANISM
Original Filed Oct. 27, 1953 8 Sheets-Sheet 2

INVENTOR
Sidney B. Whittier
BY Brown and Mikulka
ATTORNEYS

FIG. 7

Dec. 27, 1960     S. B. WHITTIER     2,966,102
CAMERA SHUTTER MECHANISM Original Filed Oct. 27, 1953     8 Sheets-Sheet 5

FIG. 8

INVENTOR
Sidney B. Whittier

BY Brown and Mikulka
ATTORNEYS

Dec. 27, 1960     S. B. WHITTIER     2,966,102
CAMERA SHUTTER MECHANISM
Original Filed Oct. 27, 1953     8 Sheets-Sheet 6

FIG. 9

INVENTOR
Sidney B. Whittier
BY Brown and Mikulka
ATTORNEYS

Dec. 27, 1960     S. B. WHITTIER     2,966,102
CAMERA SHUTTER MECHANISM Original Filed Oct. 27, 1953     8 Sheets-Sheet 7

FIG. 10

INVENTOR
Sidney B. Whittier

BY Broward Mikulka
ATTORNEYS

FIG. 11

United States Patent Office 2,966,102
Patented Dec. 27, 1960

2,966,102

CAMERA SHUTTER MECHANISM

Sidney B. Whittier, Concord, Mass., assignor to Polaroid Corporation, Cambridge, Mass., a corporation of Delaware Original application Oct. 27, 1953, Ser. No. 388,641, now Patent No. 2,877,697, dated Mar. 17, 1959. Divided and this application May 15, 1957, Ser. No. 659,313

8 Claims. (Cl. 95—11.5)

This invention relates to photographic apparatus and more particularly to novel shutter mechanism for association with the exposure aperture of a camera.

This application is a division of my copending application Serial No. 388,641, filed October 27, 1953, now Patent No. 2,877,697.

In the copending application of Murry N. Fairbank, Serial No. 58,258, filed November 4, 1948 for Photographic Apparatus (now Patent No. 2,662,457), there is disclosed a novel shutter mechanism of the type comprising an aperture-covering element or blade mounted for substantially free and frictionless rotation and normally held by a suitable holding means in a stationary aperture-covering position. The shutter includes means for applying a sharp impact to the closure element to rapidly move the same so as to disengage it from its holding means and so as to uncover the exposure aperture. There are provided at a predetermined point in the path of movement of the closure element suitable rebound means for engaging a portion of said element for the purpose of reversing the direction of rotation of said element so as to return the latter to aperture-covering position. The time during which the exposure aperture is uncovered depends upon the speed and length of travel of the element, the length of travel being preferably controlled by one or more rebound members positioned along the arcuate path of an engagement portion of said element. Means may be provided for adjusting the position of a rebound member in the path of said engagement portion or for adjusting a plurality of rebound members into and out of position for engagement with the closure element.

An object of the invention is to provide, in a shutter structure of the above type, a novel flash synchronizing means comprising a free-moving inertia tripper for accurately controlling the relative timing of the closing of a flash circuit and the movement of the aperture-covering element.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

In accordance with the present invention there is provided a novel shutter structure comprising, as elements thereof, an aperture-covering means or shutter blade mounted for relatively free movement, and an impulse member or kicker arm for imparting an impact to said shutter blade to move said blade to an aperture-uncovering position. Means are provided for moving the kicker arm into a cocked position wherein it is retained by a latch until released for impact with a portion of the shutter blade. There is provided an inertia tripper adapted to engage the latch, releasing the kicker arm. The inertia tripper is mounted for substantially free rotary movement and is normally retained by a trigger adapted to release the inertia tripper for movement when the kicker arm has been moved into its cocked position. Means for completing an electrical circuit to energize a flash-producing means is rendered operable by the action of the inertia tripper, the latter being adapted to engage the latch, releasing the kicker arm at a predetermined interval after the flash-producing means is rendered operable and thereby synchronizing the operation of said means with the operation of the shutter. It is to be understood that the term "shutter blade" is used herein in a generic sense to cover any type of closure element which is operative either alone or together with other elements to effect the closure of an exposure aperture in a camera, and that the term "inertia tripper" is also intended to be generic in its scope and to include fly wheels, solid disks, counter-balance arms, etc. which when actuated possess sufficient kinetic energy to coact with or engage one or more elements of the shutter mechanism and render the same operable.

Referring now to the drawings, wherein like numerals denote like parts, there is shown in Figs. 1 through 6 one form of shutter mechanism comprehended by the present invention, the associated elements of which are represented as they would appear from a position in front of the camera. Directions of the rotation and movement of the associated elements as hereinafter described are those which would be observed when said elements are viewed from the above-described position, the descriptive language being in accordance with said point of observation.

As a means for enclosing and mounting the operative elements of the shutter mechanism, there is provided a housing including a front portion (not shown) and a rear or base portion generally indicated at 12, and having a lens aperture 14. A suitable aperture control means may be provided for association with said lens aperture, said means preferably comprising a disk-type diaphragm 16 shown in Fig. 1 and having a plurality of apertures therein. Diaphragm 16 is rotatably mounted to permit movement of any one of apertures 17 into operative alignment with lens aperture 14. A bracket 18 suitably secured to base portion 12 is provided with a formed-up spindle 20 on which is mounted diaphragm 16, the latter having a suitable opening 22 in its center for receiving spindle 20. The diaphragm is retained on spindle 20 by spider 24 having a central body portion 26 secured to spindle 20 by screws 28 and three resilient legs 30 adapted to bear upon the surface of the diaphragm. As a means for rotating the diaphragm and for operatively aligning any one of the apertures 17 adjacent lens aperture 14, there is provided a toothed peripheral portion of diaphragm 32 forming a gear, a pinion 34 meshed with said gear, and a control knob 36 rigidly attached to said pinion by a shaft 38 journaled in the shutter housing. A detent spring 44 secured to said housing engages a detent notch 42 in disk 40 mounted on shaft 38 for releasably holding any one of the apertures 17 in diaphragm 16 in operatively aligned position.

To control the exposure through the lens aperture 14 of the shutter, there is provided a shutter blade 46 mounted at one end for substantially free rotary movement in and out of aperture-covering positions and having an aperture-covering portion 46a and a projecting lug 50 on its other extremity for cooperating with the shutter-actuating means. The shutter blade is secured to a hub 52 mounted on a shaft 54 intermediate its ends, shaft 54 being journaled at one end in a suitable bearing 56 formed in housing base portion 12 and journaled adjacent its other end in bracket 18.

For holding the shutter blade in an aperture-covering position, that is, with aperture-covering portion 46a positioned to obstruct the passage of light through lens aperture 14, one edge of shutter blade 46 is provided with a rolled portion 48 of some magnetic material and is adapted to be brought against and retained by a magnet 58 which defines the aforesaid closed position of the shutter blade. Magnet 58 is secured to a resilient support arm 60 having a flanged base portion 62 at one end by which it is secured to bracket 18. Support arm 60 is biased toward shutter blade 46 and is held at a predetermined position by a somewhat rigid arm 64 toward which it is biased, arm 64 having a flanged base portion 66 by which it is secured to bracket 18. Magnet 58 mounted on arm 60 comprises means for preventing the rebound of shutter blade 46 once contact of portion 48 and magnet 58 has been established, magnetic force exerted upon portion 48 by magnet 58 being adapted to this purpose. Support arm 60 acts as a shock absorber for the magnet by permitting magnet 58 to move slightly under an impact of shutter blade 46 and thus absorb the kinetic energy of the shutter blade when the latter returns to a position of rest. Arm 64 in turn serves to absorb the kinetic energy of the shutter blade transmitted to support arm 60 and to dampen the vibration of the latter.

Figure 1:
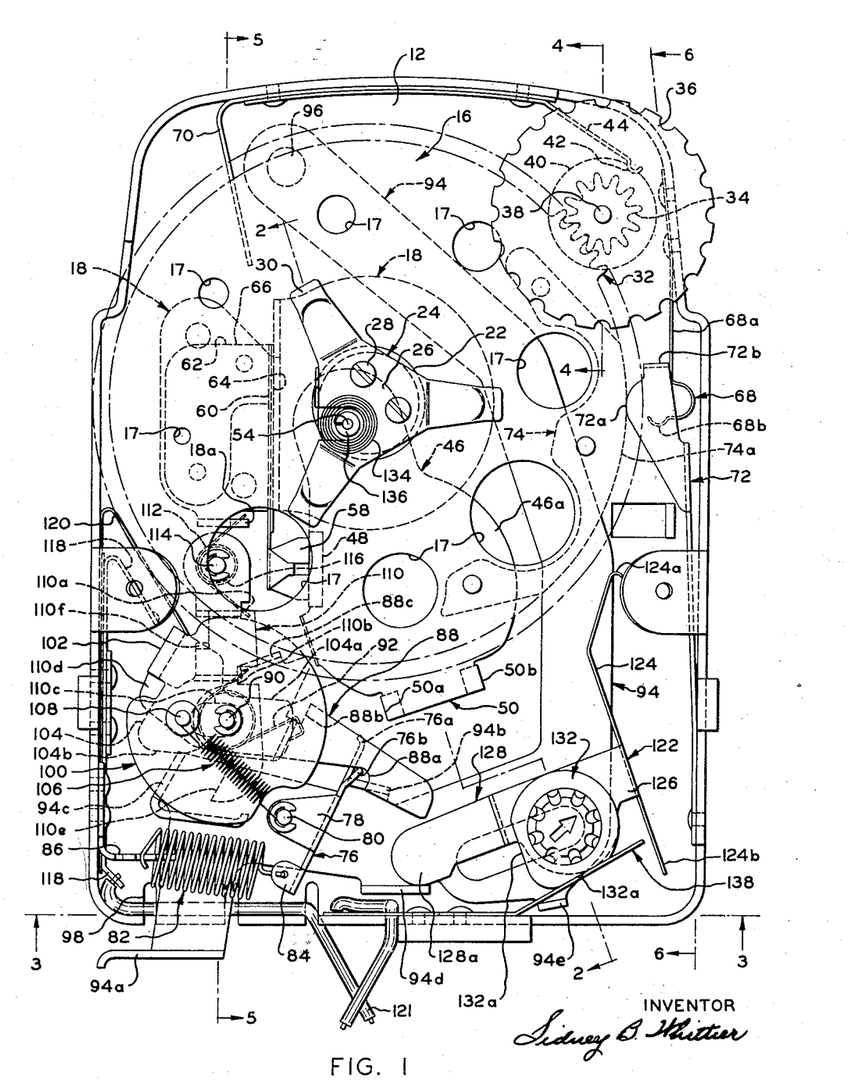
Figure 1 is a diagrammatic plan view of a shutter assembly embodying the present invention, the front housing being removed and the shutter being viewed from the front toward the camera.
Figure 2:
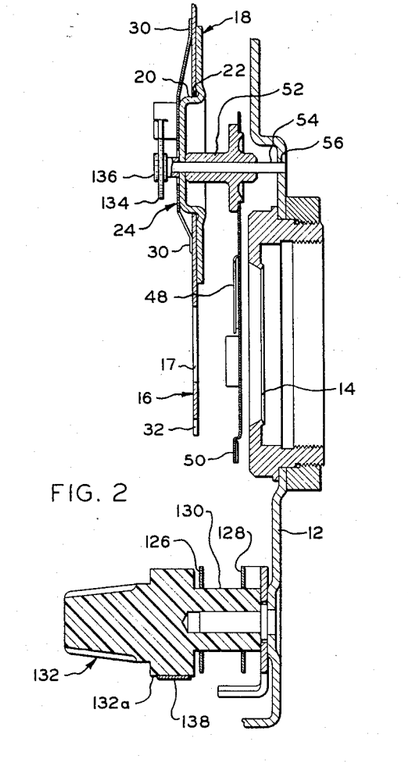
Fig. 2 is a diagrammatic sectional view through the shutter of Fig. 1 taken substantially along the line 2—2 and showing in detail a mounting of the shutter blade, diaphragm, and time control knob.
Figure 3:
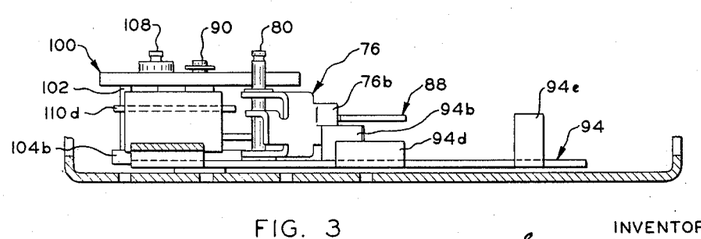
Fig. 3 is a similar view taken along the line 3—3 showing the tripper and the kicker, including its mounting.
Figure 4:
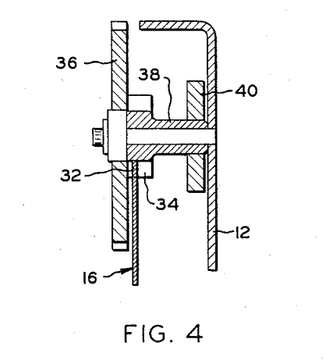
Fig. 4 is a similar view taken along the line 4—4 showing in detail means for controlling the diaphragm.
Figure 5:
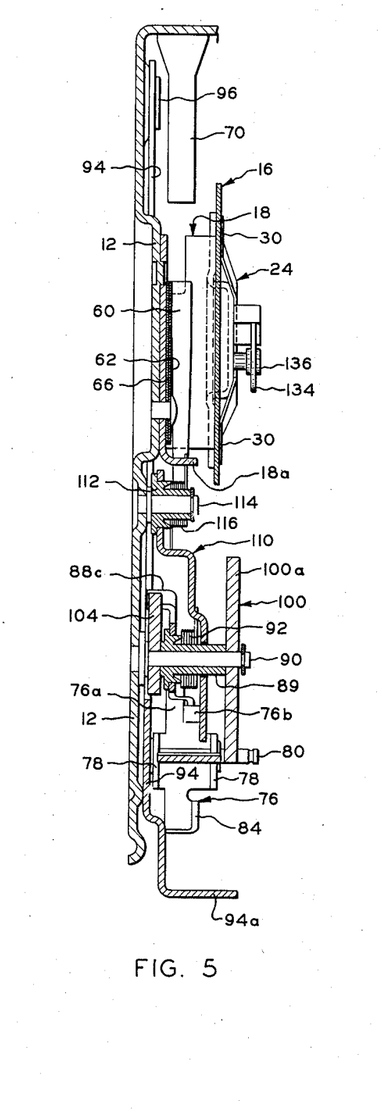
Fig. 5 is a similar view taken along the line 5—5 showing in detail elements of the shutter including the tripper and latch, and the mounting thereof.
Figure 6:
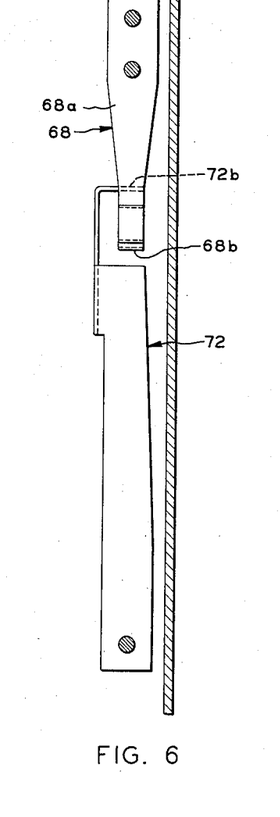
Fig. 6 is a similar view taken along the line 6—6 showing a rebound spring and means for moving said spring in and out of position to engage the shutter blade.

For producing an exposure of accurately controlled duration, there is provided a kicker means, to be more fully described, for imparting an impulse to the shutter blade for rotating said blade in a counterclockwise direction uncovering lens aperture 14, the left hand surface 50a of lug 50 being suitable for receiving said impulse. In addition to means against which a force for rotation may be applied, lug 50 serves as a contributing means for determining the direction and extent of rotation of the shutter blade in the following manner. The extent of counterclockwise rotation of shutter blade 46 when actuated for movement by the kicker means is limited by contact of the lug 50 with a rebound spring 68 mounted so as to intersect right hand surface 50b of lug 50 during the arcual movement of the latter. Rebound spring 68 may be formed of any suitable resilient material and, as shown in Fig. 1, preferably comprises a resilient base portion 68a secured to housing portion 12 and an engagement portion 68b adapted to engage lug 50 on shutter blade 46. It will be seen that the measure of counterclockwise rotational movement of the shutter blade from the closed position shown in Fig. 1 and consequently the exposure time of the shutter is determined by the arcual distance initially separating lug 50 with a rebound spring 68, by the mass and velocity of the rotating shutter blade, and by the deflection characteristics of the rebound spring 68 under a load caused by impingement of lug 50 thereupon. A second rebound spring 70 may be positioned in the arcuate path of movement of lug 50, thus increasing the length of travel of the shutter blade when the first spring is removed from its path and thereby increasing the interval during which the aperture is uncovered. Further, it will be apparent that the speed of rotation of the shutter blade through a single exposure cycle comprising counterclockwise and clockwise rotation is substantially predetermined by such factors as the magnitude and characteristics of delivery of the force applied to lug 50 for initiating its counterclockwise rotation, by the mass of the shutter blade, by the deflection characteristics of a rebound spring and by the amount of friction existing between shaft 54 and bearings in which it is journaled.

Means are provided for positioning engagement portion 68b of rebound spring 68 out of the arcuate path of lug 50, this means comprising a resilient arm 72 secured to the shutter housing and having a cam-following portion 72a adapted to coact with cam 74. The extremity of arm 72 is provided with turned-down tab 72b adapted to engage rebound spring 68 and deform the latter so as to move engagement portion 68b thereof from the path of lug 50 when cam 74 coacts with cam-following portion 72a of said arm to move the latter to the right. Cam 74 comprising a plate secured to diaphragm 16 is formed as shown having an engagement portion 74a adapted to coact with cam-following portion 72a of arm 72. The second rebound spring 70 is secured to housing portion 12 with a portion of said spring extending into the path of lug 50. It will be apparent that the length of arcuate travel of lug 50 can be varied by moving spring 68 into or out of the path of said lug thus varying the "shutter speed." In Fig. 1 the position of the elements shown represents a setting of rebound spring 68 for a minimum shutter speed, that is a setting at which lug 50 will travel a maximum arcual distance to and from rebound spring 70 and during which time shutter blade 46 will uncover aperture 17. It is further apparent that the elements are set for maximum shutter speed when rebound spring 68 is superposed in the arcuate path of lug 50 so that the latter will travel a minimum arcual distance and shutter blade 46 will uncover aperture 17 for a comparatively brief time. A particular diaphragm aperture in exposure position coupled with a correlated setting of either rebound spring 68 or 70 yields a predetermined exposure value. A plurality of appropriate numbers (not shown) indicating these predetermined exposure values are inscribed circumferentially on the surface of diaphragm 16 adjacent its central portion, these numbers being visible through a suitable opening or window (not shown) in the front portion of the housing.

Figure 7:
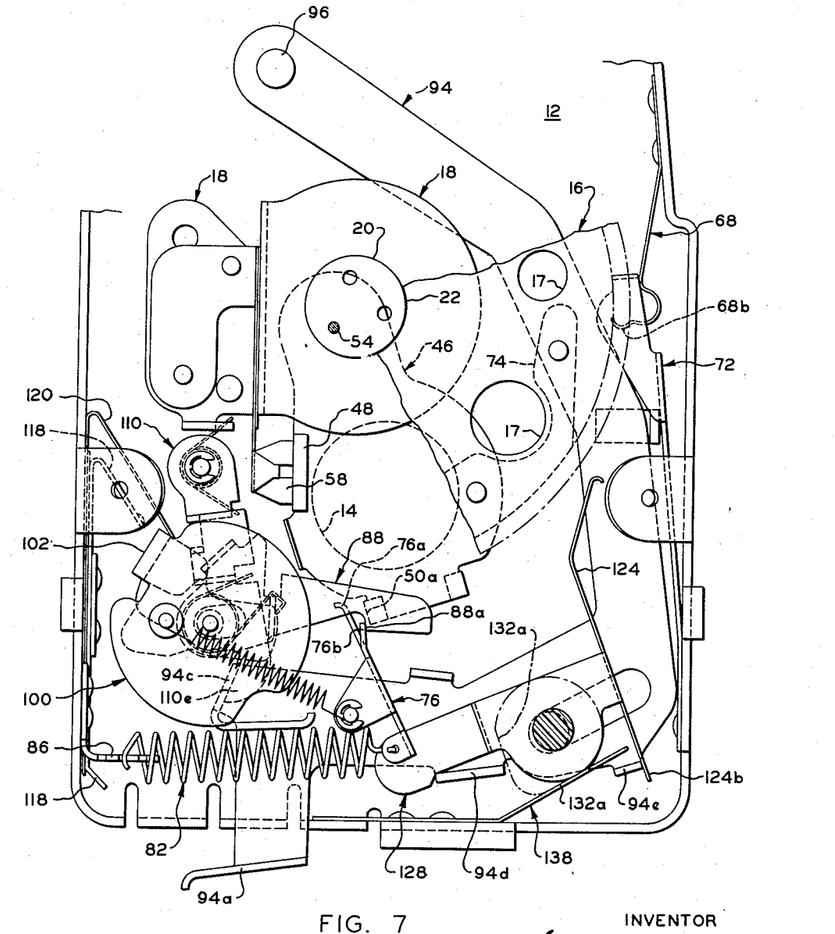
Fig. 7 is a diagrammatic plan view with parts broken away of the shutter of Fig. 1, the elements thereof in position just prior to release of the tripper and commencement of an exposure cycle.

The actuating mechanism for the shutter blade is illustrated in Figs. 1 and 7, Fig. 1 showing the elements in a position of rest and Fig. 7 showing the elements in a cocked position substantially that which would prevail at the instant when the inertia tripper is about to be released by the trigger to initiate an exposure cycle. As a means for imparting an impulse to the shutter blade, there is provided a kicker arm 76 having a pair of centrally located flanges 78 on which it is pivotally mounted on pin 80 and an engagement portion 76a at one extremity adapted to contact lug 50 on the shutter blade to apply an impulse thereto. The kicker arm 76 is biased for clockwise rotation by a tension spring 82 attached at its ends respectively to a flange 84 on the other extremity of said kicker arm and to a bracket 86 secured to housing portion 12. For varying the tension of spring 82 and consequently the driving impulse imparted to the shutter blade, bracket 86 is provided with a plurality of notches adapted to retain spring 82. In order that kicker arm 76 may be held in a cocked position by a latch 88, there is provided on said kicker arm a tab 76b adapted to be engaged by a portion of said latch. At its cocked position kicker arm 76 is adapted when released to rotate in a clockwise direction, engaging lug 50 and transmitting a driving force to said lug for a brief period. It will be seen in the aforesaid relation of elements that clockwise rotation of kicker arm 76 causes counterclockwise rotation of shutter blade 16, rotational force being continuously transmitted by said kicker arm to said lug until divergence in the arcual movement of said shutter blade and kicker arm due to separate pivotal mountings thereof breaks their contact with one another. Under the impetus initially supplied by kicker arm 76, the shutter blade continues to rotate in a counterclockwise direction until it impinges either rebound spring 68 or spring 70 and its direction of rotation is reversed thereby as previously described.

Latch means are provided for releasably holding kicker arm 76 at its cocked position and in the form shown comprises a latch arm 88 mounted at one end on hub 89 pivotally mounted on pivot pin 90 and having an engagement portion 88a formed to engage tab 76b on kicker arm 76. Resilient means such as a torsion spring 92 coiled around pivot pin 90 are provided for urging latch arm 88 in a clockwise direction to engage kicker arm 76, one end of said torsion spring being retained in notch 88b formed in latch arm 88.

Means are provided for mounting kicker arm 76, for moving said kicker arm into a cocked position and for operating the shutter mechanism. In the form shown this means comprises a generally C-shaped kicker-release arm indicated at 94, pivotally mounted at pin 96 on housing 12 above lens aperture 14 and having an end portion 94a extending through a slot 98 in the bottom portion of said housing, said end portion 94a being engageable either manually or by a suitable linkage means for movement in a counterclockwise direction (to the right) for operating the shutter mechanism. Release arm 94 is normally biased to the left by tension spring 82 secured to kicker arm 76, which is in turn pivotally mounted on said release arm. There is provided, as a limit stop for the clockwise rotation of kicker arm 76, a turned-up tab 94b on release arm 94.

In accordance with the present invention, there is provided a substantially free-moving inertia tripper 100 for releasing latch arm 88 from engagement with kicker arm 76 in its cocked position. In the form shown, inertia tripper 100 generally comprises a yokelike member having a first arm or inertia portion 100a of substantial mass, a second or actuating arm 104, and a connecting member 102 joining the two arms. The actuating portion 104 has at least a portion 104a adapted to engage a turned-down tab 88c on latch arm 88 to release the latter from engagement with the kicker arm. Tripper 100 is rotatably mounted on the housing on pivot pin 90, arm portions 100a and 104 being journaled thereon. As a means for biasing the inertia tripper in a counterclockwise direction, there is provided a tension spring 106 secured at one of its ends by stud 108 to inertia portion 100a and at its other end to pivot pin 80 on kicker release arm 94.

As a means for retaining inertia tripper 100 and for releasing the latter to initiate an operative cycle of the shutter mechanism when the kicker arm has been moved to its cocked position, there is provided a trigger arm formed as shown and generally indicated at 110. Trigger arm 110 is secured to hub 112 pivotally mounted on pin 114 secured in housing portion 12 and is normally biased in a clockwise direction by such means as a torsion spring 116 coiled around pin 114 and retained at its extremities in notch 110a in trigger arm 110, and tab 18a turned up from bracket 18. Further contributing to the force urging the trigger in a clockwise direction is torsion spring 92 one end of which is retained in notch 110b formed in trigger arm 110 and its other end being retained as previously described by latch 88. A slot 110c is formed in trigger arm 110 through which pivot pin 90 extends, said pin and said slot cooperating to limit pivotal movement of said trigger arm for retaining tripper 100 against the bias of spring 106. Trigger arm 110 is provided with an engagement portion 110d adapted to engage connecting member 102 of said tripper. The trigger is also provided with a second engagement portion 110e adapted to be engaged by a turned-up flange 94c on kicker release arm 94 for pivoting the trigger in a counterclockwise direction to release tripper 100. A turned-down tab 110f on trigger arm 110 serves as a limit stop restricting the pivotal movement of latch 88 when kicker arm 76 is released, said turned-down tab 110f on said latch 110 being adapted for engagement with tab 88c on the latch arm.

Means are provided for completing an electrical circuit to a photo flash lamp (not shown) in synchronism with the operation of the shutter mechanism. This means comprises, in the form shown, a pair of conducting arms 118 and 120 secured to housing portion 12. Arm 118 suitably secured to said housing portion and insulated therefrom is connected by a lead wire 121 to a flash receptacle (not shown) of conventional design mounted on the camera. Arm 120 mounted on said housing portion and grounded therein is biased toward arm 118 so as to contact the latter when means holding arm 120 are disengaged therefrom. As a means for completing said flash lamp circuit and actuating the shutter blade at a predetermined interval thereafter, connecting member 102 of inertia tripper 100 is adapted to engage arm 120 to hold the latter away from contact with arm 118 until the tripper is released for rotation, and then allow the two arms to contact one another completing the flash lamp circuit.

In order to operate the shutter, portion 94a of kicker release arm 94 is engaged by the operator and moved to the right so that arm 94 is rotated in a counterclockwise direction against the bias of spring 82. This counterclockwise rotation of kicker release arm 94 moves the kicker 76 mounted thereon upward and to the right toward shutter blade 46, latch 88 engaging said kicker and being rotated thereby in a counterclockwise direction around pivot pin 90 against the bias of spring 92. In Fig. 7 it can be seen that kicker 76 has been moved into a position behind lug 50 so that it is capable of transmitting an impulse to shutter blade 46 when said kicker is released. At this point kicker 76 is held by latch portion 88a against the bias of spring 82, and an additional counterclockwise movement of latch 88 against the bias of spring 92 is required in order to release said kicker. Continued counterclockwise rotation of kicker release arm 94 past the position shown in Fig. 7 causes turned-up flange 94c thereon to engage portion 110e of trigger 110 to pivot the latter in a counterclockwise direction against the bias of springs 92 and 116. As trigger 110 is pivoted in a counterclockwise direction, engagement portion 110d thereof is withdrawn from engagement with connecting member 102 of tripper 100, permitting the latter to rotate in a counterclockwise direction under the bias of spring 106. During the initial period of rotation of tripper 100, contact arm 120 restrained thereby is permitted to contact arm 118 towards which it is biased and thus complete the circuit to a flash lamp. Tripper 100 continues to rotate until actuating portion 104a of actuating arm 104 strikes tab 88c on latch 88, pivoting the latter in a counterclockwise direction to release kicker arm 76 therefrom. Kicker arm 76 then rotates in a clockwise direction under the bias of spring 82 so as to deliver a sharp impact to lug 50 rotating the shutter blade. The force of this initial impact may be adjusted by varying the tension of spring 82, adjustments being made by engaging a portion of spring 82 in a particular one of said notches in said bracket 86.

After tripping latch 88, tripper 100 comes to rest with the edge 104b of actuating arm 104 of said tripper bearing against the heel of flange 94c on kicker release arm 94. Removal of the operative force exerted on said release arm 94 permits said arm to return under the bias of spring 82 to the position of rest as shown in Fig. 1, the heel of flange 94c bearing against said edge 104b of tripper arm 104, rotating the tripper in a clockwise direction against the bias of spring 106 to the position of rest in Fig. 1. Trigger 110, urged to the left by springs 92 and 116, then engages connecting member 102 to retain tripper 100 in the said position of rest.

Figure 8:
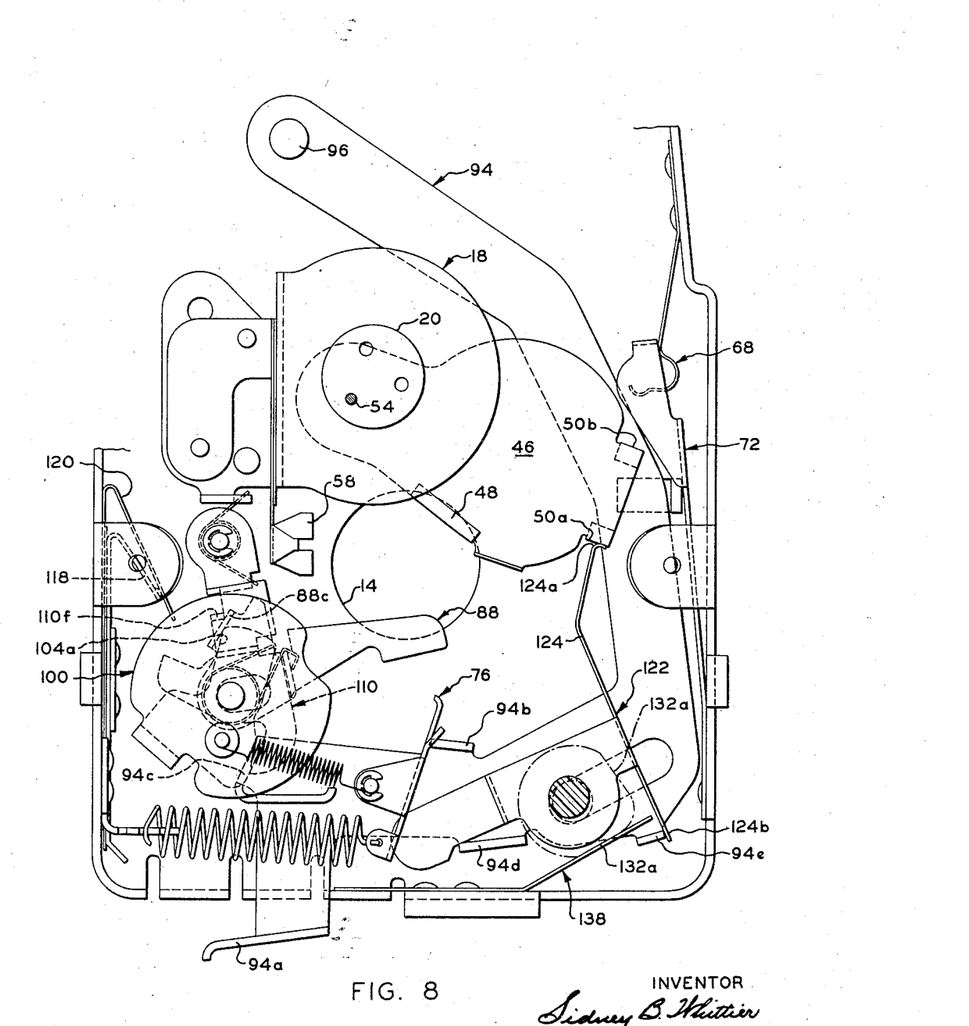
Fig. 8 is a similar view with the elements shown in position after the shutter blade had been rotated, the latter being retained at time exposure position.

Means are provided for holding the shutter blade in an aperture-uncovering position during time exposures and, in the form shown in Fig. 1, generally comprise a member movable into the path of the shutter blade, this member being effective to prevent the return movement of the shutter blade to aperture-covering position. This means is adapted to manual setting for a "bulb exposure" and remains at that setting after it is used. A time exposure latch indicated generally at 122 comprises a resilient latching arm 124 having a shutter engagement portion 124a and an actuating portion 124b. Latching arm 124 constitutes the connecting element of a yoke-shaped member having legs 126 and 128, said legs being pivotally mounted on the eccentric shank 130 of a manually engageable control knob 132 journaled into housing portion 12. Leg 126 is provided for strength and rigidity while leg 128 is formed as shown having an extended toe portion 128a engageable with a turned-up tab 94d on kicker release arm 94. The time exposure latch is rendered operative by pivoting control knob 132, and the eccentric shank 130 thereof, approximately 90° in a counterclockwise direction so as to move legs 126 and 128, mounted thereon, to the left as shown in Fig. 8. When kicker release arm 94 is pivoted in a counterclockwise direction, tab 94d is moved (to the right) out of engagement with toe portion 128a and another turned-up tab 94e on said release arm engages actuating portion 124b of latching arm 124, pivoting the latter in a counterclockwise direction and interposing engagement portion 124a of arm 124 in the arcual path of lug 50. During the counterclockwise rotation of shutter blade 46, portion 124a of arm 124 is brushed aside by lug 50, arm 124 then springing inward (to the left) so that portion 124a intercepts lug 50 during the return rotation of shutter blade 46, thereby precluding further rotation of the latter. It will be understood that the deflection characteristics of latching arm 124 are such as to cause no appreciable diminution in speed of counterclockwise rotation of the shutter blade, thus insuring accurate time exposures. Means for rotating latching arm 124 in a clockwise direction to release the shutter blade comprise said toe portion 128a and tab 94d on release arm 94, the curved edge 128b of toe portion 128a coacting with tab 94d to pivot time latch 122 when release arm 94 is moved in a clockwise direction (to the left). In order to return shutter blade 46 to an aperture-covering position after release by latching arm 124, shutter blade 46 is biased against latching arm 124 by torsional hair spring 134 connected respectively to collar 136 on the end of shaft 54 and spider 24. The hair spring has substantially no effect upon the overall shutter speed during a given rotational cycle of the shutter blade, inasmuch as said hair spring, while resisting shutter rotation in a counterclockwise direction, accelerates rotation of the shutter blade in a clockwise direction, one force substantially canceling the other during the complete shutter cycle. The time exposure latch may be returned to an inoperable or "instantaneous" exposure position by rotating control knob 132 approximately 90° in a clockwise direction. For retaining control knob 132 at either an "instantaneous" or "bulb" exposure setting, there is provided a resilient retaining arm 138 secured to the housing and adapted to bear against suitably formed flat portions 132a on the control knob.

Figure 9:
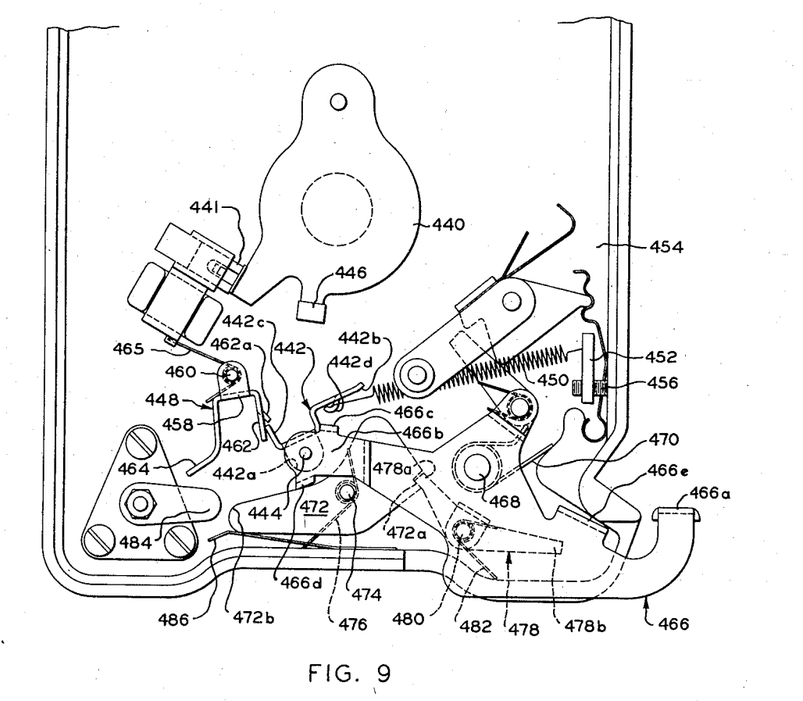
Fig. 9 is a diagrammatic, fragmentary plan view of another shutter assembly embodying the present invention, the rear housing and its associated elements being removed, and the shutter assembly being viewed from the focal plane of the camera with the elements of the shutter being illustrated in their normal position of rest.
Figure 10:
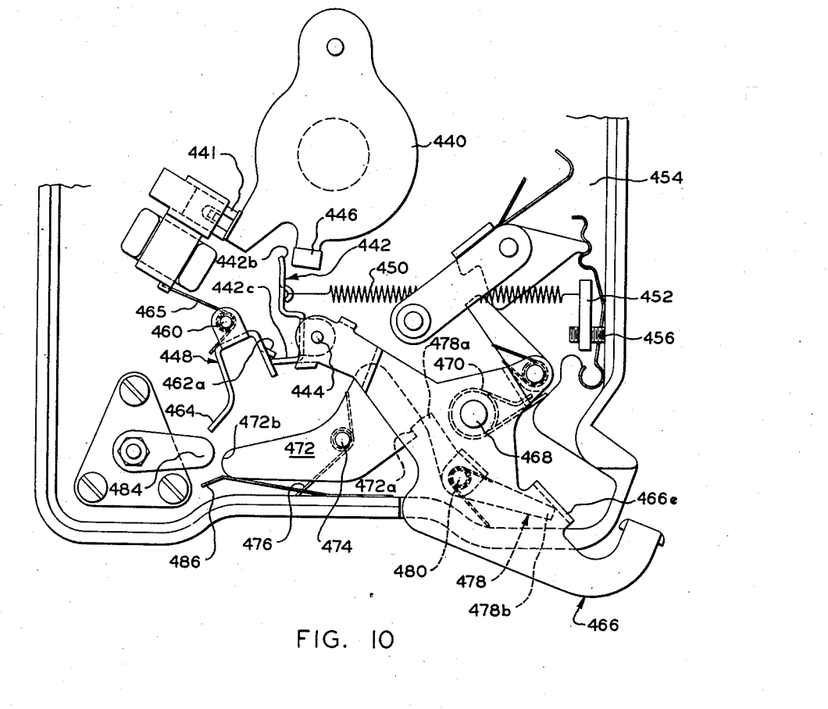
Fig. 10 is a similar view of the shutter of Fig. 9 with the elements thereof positioned so that the tripper is about to be released to commence an exposure cycle and effect the rotation of the shutter blade.
Figure 11:
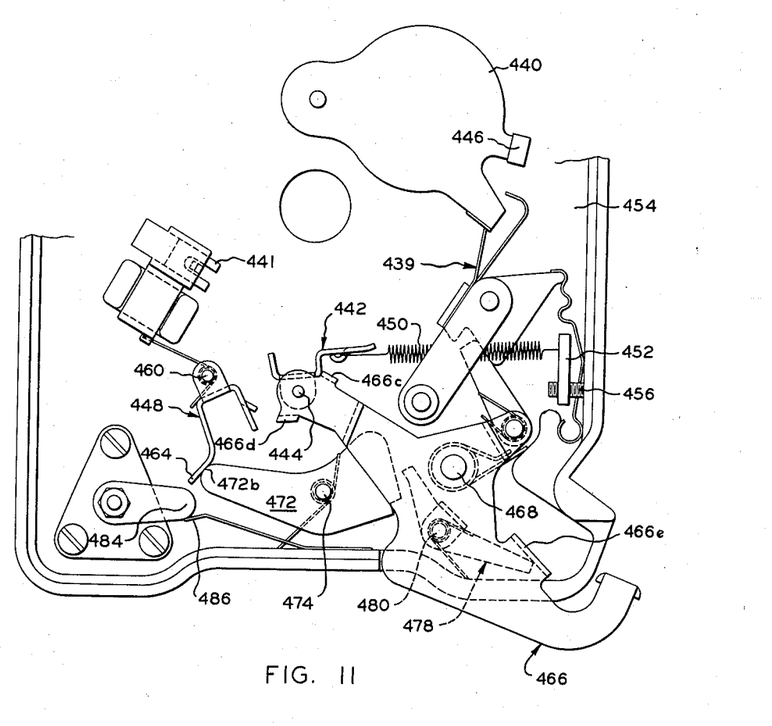
Fig. 11 is a similar view of the shutter of Fig. 9 where the shutter blade has just been rotated and is retained at time exposure position.

A shutter-actuating mechanism comprising another embodiment of the invention is illustrated in Figs. 9, 10 and 11, Fig. 9 showing the elements in a position of rest Fig. 10 showing the elements at a position substantially that which would prevail at the instant before the shutter blade is about to commence a given exposure cycle, and Fig. 11 showing substantially the position of the elements after the shutter blade has commenced an exposure cycle, said shutter blade being illustrated as being retained in open position by a time latch generally indicated at 439. It is understood that the shutter comprising this embodiment of the actuating mechanism includes, in addition thereto, the shutter structure and associated elements of either the aforementioned copending application or the herein disclosed shutter. The shutter blade and actuating mechanism therefore are mounted on a housing the front portion of which is indicated at 454.

As a means for imparting an impulse to a shutter blade 440 to rotate the same from an aperture-covering position where it is retained by magnet 441, there is provided a kicker arm 442 having a central portion 442a at which it is pivotally mounted on pin 444 and an engagement portion 442b at one end adapted to contact lug 446 on shutter blade 440 to apply an impulse thereto. The other end 442c of kicker arm 442 is adapted for engagement by a latch 448 for retaining said kicker arm in its cocked position. The kicker arm 442 is biased for clockwise rotation by a tension spring 450 attached at its ends, respectively, to the kicker arm at 442d and to block 452. As a means for adjusting the tension of spring 450 to vary the driving impulse imparted by the kicker arm to the shutter blade, block 452 is secured to housing 454 by an adjustable screw 456 permitting variation of the position of the block.

As a means for releasably retaining the kicker arm in its cocked position, there is provided a generally yoke-shaped latch 448 having a cross member 458 at which it is pivotally mounted on pin 460 secured to housing 454, a latch arm 462 and a curved tripper engagement arm 464. A torsion spring 465 coiled around pin 460 acts to bias latch 448 in a counterclockwise direction so that latch arm 462, having a hook portion 462a formed as shown, bears against the end of engagement portion 442c of kicker arm 442, and hook portion 462a engages the end of portion 442c of said kicker arm to hold the latter at its cocked position.

For mounting kicker arm 442 and moving said kicker arm into its cocked position, there is provided a kicker release arm 466 pivotally mounted in the housing on pin 468 and formed as shown having an end portion 466a extending through a slot in the housing. Kicker arm 442 is mounted on the other end portion 466b of release arm 466 and end portion 466a is engageable either manually or by suitable linkage means for movement in a clockwise direction for moving kicker 442 into cocked position with engagement portion 442b adjacent lug 446 on shutter blade 440. A turned-down tab 466c on end portion 466b of release arm 466 is provided as a limit stop for the rotation of kicker arm 442. Release arm 466 is normally biased in a counterclockwise direction by a torsion spring 470 coiled around pin 468.

Means are provided for releasing latch 448 from engagement with kicker arm 442 and, in accordance with the present invention, comprises a free-moving inertia tripper generally indicated at 472. Tripper 472 is pivotally mounted at its central portion on pin 474 secured to housing 454 and includes a trigger engagement notch 472a adjacent one end and a cam portion 472b comprising its other end and adapted to coact with arm 464 of latch 448 to cause the latter to release the kicker arm. Tripper 472 is normally biased for rotation in a clockwise direction by a torsion spring 476 coiled around pin 474 and, when released for rotation, comes to rest against the bottom portion of housing 454.

As a means for retaining inertia tripper 472 and for releasing the same to initiate an operative cycle of the shutter mechanism, there is provided a trigger comprising an angular arm 478 mounted at its central portion on pin 480 secured to housing 454. One end portion 478a of trigger 478 is adapted for engagement with notch 472a in tripper 472 for retaining the latter while the other end portion 478b of trigger 478 is adapted to be engaged by a turned-down tab 466e on release arm 466 for pivoting the trigger in a clockwise direction to disengage end portion 478a thereof from notch 472a on tripper 472, releasing the latter for rotation. As a means for normally biasing trigger 478 in a counterclockwise direction for holding said trigger end portion 478a in engagement with notch 472a, there is provided a torsion spring 482 coiled around pin 480.

Means are provided for completing an electrical circuit to a photo flash lamp (not shown) in synchronism with the operation of the shutter mechanism. This means comprises, in the form shown, a pair of conducting arms 484 and 486 secured to housing 454. Substantially rigid arm 484 suitably secured to said housing and insulated therefrom is connected by a lead wire to a flash receptacle (not shown) of conventional design mounted on the camera. Arm 486 of resilient material mounted on said housing portion and grounded therein is biased toward arm 484 so as to contact the latter when means holding arm 486 are disengaged therefrom. As a means for completing said flash lamp circuit and actuating the shutter blade at a predetermined interval thereafter, cam portion 472b of inertia tripper 472 is adapted to engage and hold arm 486 away from contact with arm 484 until the tripper is released for rotation.

For operating the shutter mechanism, end portion 466a of kicker release arm 466 is engaged by the operator and pressed downward, pivoting said arm in a clockwise direction and thereby moving kicker 442 mounted on the other end 466b thereof upward and causing end 442c of kicker arm 442 to be engaged by hook 462a on latch 462. Continued clockwise rotation of release arm 466 results in both pivoting kicker 442 in a counterclockwise direction and moving the same until it is in a position (as shown in Fig. 10) to deliver an impact to lug 446 when released. At this point the continued rotation of arm 466 causes turned-down tab 466e on arm 466 to engage end portion 478b of trigger 478, rotating the latter in a clockwise direction, disengaging end portion 478a from notch 472a and releasing tripper 472 for clockwise direction under the bias of spring 476. The initial rotation of tripper 472 results in the release of arm 486, permitting the same to contact arm 484 toward which it is biased, thereby completing the flash lamp circuit. Tripper 472 then continues to rotate until cam portion 472b coacts with curved latch arm 464 of latch 448, the position of tripper 472 and latch 448 at substantially this instant being illustrated in Fig. 11. Cam portion 472b coacts with arm 464 to pivot latch 448 in a clockwise direction, thereby disengaging hook 462a from engagement portion 442c of kicker 442, releasing the latter for rotation under the tension of spring 450. After kicker 442 is released for impact with lug 446 on shutter blade 440, kicker 442 and tripper 472 continue to rotate until said kicker comes to rest against tab 466c and said tripper comes to rest against a portion of housing 454.

At this point, end portion 466a of release arm 466 may be released by the camera user, permitting arm 466 to rotate in a counterclockwise direction under the bias of spring 470 for returning the operative elements of the shutter-actuating mechanism to their initial position of rest (Fig. 9). Tab 466e on arm 466 is disengaged from end portion 478b of trigger 478, permitting the latter to rotate in a counterclockwise direction until end portion 478a comes to rest against tripper 472. Tab 466d on arm 466 engages tripper 472, rotating it in a counterclockwise direction until notch 472a is engaged by end portion 478a of trigger 478. Kicker 442 mounted on arm 466 is also returned to its original position, end 442c of said kicker coacting with engagement arm 462 to deflect latch 448 until end 442c is engaged by hook 462a.

It is evident that the use of a free-moving inertia element or stripper which is independent from those elements contributing to the impulse applied to the shutter blade for rotating the latter provides means for firing a flash lamp in accurate synchronism with the action of the shutter blade. The duration of the time interval between the completion of the flash lamp circuit and the application of an impulse to the shutter blade can be accurately controlled and varied in accordance with the illumination characteristics of the particular flash lamp, thereby insuring that the camera aperture is fully uncovered when the flash reaches peak intensity, and that this peak is reached at any desired instant during the shutter exposure cycle. The duration of the time interval may be adjusted by varying the mass and thereby inertia characteristics of the tripper, by varying the shape or location of those portions of said tripper which coact with elements of the shutter to render them operative, by varying the location of shutter elements so as to increase or decrease the angle of rotation of the tripper, by varying the tension or resiliency of the spring which actuates the tripper, or by any combination of the above methods. It is further evident that a flash lamp firing switch, comprising two contacts biased towards one another and which does not depend on the kinetic energy of a moving element of the shutter to close the contacts, provides for the positive closing of the flash lamp circuit with low resistance contact of substantial duration. This arrangement has obviated the danger of reopening of the circuit before the flash bulb is fired.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A camera shutter comprising, in combination, a casing including an exposure aperture, a blade movably mounted on said casing and normally located in a position covering said aperture, an impulse member, means for driving said impulse member so as to deliver an impact to said blade to impart an aperture-uncovering movement to said blade, a latch for retaining said impulse member in a set position in readiness to deliver an impact to said blade, means providing a normally open electrical circuit for a flash lamp, and means for closing said circuit and for releasing said latch after a predetermined interval following closing of said circuit, the last-named means including a movable inertia member having a predetermined rotational inertia, said interval being established as a function of said rotational inertia, said inertia member being coupled with said means providing said circuit for closing said circuit during initial movement of said inertia member, said latch being located in the path of movement of said inertia member so that said inertia member coacts with said latch to disengage the latter from said impulse member for releasing said impulse member to deliver an impact to said blade.

2. A camera shutter comprising, in combination, a casing including an exposure aperture, a blade movably mounted on said casing and normally located in a position covering said aperture, an impulse member, means for driving said impulse member so as to deliver an impact to said blade to impart an aperture-uncovering movement to said blade, a latch for retaining said impulse member in a set position in readiness to deliver an impact to said blade, means providing a flash lamp circuit and a switch in said circuit having at least one movable contact, and means for closing said switch and for releasing said latch after a predetermined interval following closing of said switch, the last-named means including a movable inertia member having a predetermined rotational inertia, said interval being established as a function of said rotational inertia, said movable contact and said latch being located in the path of movement of said inertia member whereby said member coacts with said contact during its initial movement for closing said switch and thereafter coacts with said latch for disengaging said latch from said impulse member and releasing the latter to deliver an impact to said blade.

3. A camera shutter comprising, in combination, a casing including an exposure aperture, a shutter blade mounted for rotary movement on said casing, means for retaining said blade in a position covering said aperture, an impulse member, a first spring for driving said impulse member so as to deliver an impact to said blade to impart an aperture-uncovering movement to said blade, a latch for retaining said impulse member in a set position in readiness to deliver an impact to said blade, means providing a flash lamp circuit and a switch in said circuit having at least one movable contact, and means for closing said switch and, after a predetermined interval following closing of said switch, releasing said latch, the last-named means including an inertia member mounted for rotary movement and a second spring for driving said inertia member, said inertia member having a predetermined rotational inertia, said interval being predetermined as a function of said rotational inertia, said movable contact and said latch being located in the path of rotary movement of at least a portion of said inertia member whereby said member coacts with said contact during its initial movement for closing said switch and thereafter coacts with said latch to disengage said latch from said impulse member and release the latter to deliver an impact to said blade.

4. A camera shutter comprising, in combination, a casing including an exposure aperture, a blade movably mounted on said casing and normally located in a position covering said aperture, an impulse member for delivering an impact to said blade to impart an aperture-uncovering movement thereto, a latch for retaining said impulse member in a set position in readiness to deliver an impact to said blade, means providing an electrical flash lamp circuit and a switch in said circuit having two contacts, at least one of said contacts being movable with respect to and biased toward the other of said contacts, and means for closing said circuit and, after a predetermined interval following closing of said circuit, releasing said latch, the last-named means including a movable inertia member having a set position wherein said member engages said one contact and retains it apart from said other contact, said inertia member having a predetermined rotational inertia for determining said interval, said latch being located in the path of movement of said inertia member so that said inertia member coacts with said latch to disengage the latter from said impulse member, releasing said impulse member to deliver an impact to said blade, said inertia member being adapted, during its initial movement, to release said one contact so that it moves toward said other contact, closing said electrical circuit prior to release of said impulse member.

5. A camera shutter comprising, in combination, a casing including an exposure aperture, a blade movably mounted on said casing and normally located in a position covering said aperture, an impulse member, means for driving said impulse member so as to deliver an impact to said blade to impart an aperture-uncovering movement to said blade, a latch for retaining said impulse member in a set position in readiness to deliver an impact to said blade, means providing an electrical flash lamp circuit including a switch having two contacts at least one of which is movable with respect to and is biased toward the other contact, a movable inertia member having a set position wherein said inertia member engages said one contact for retaining said one contact apart from the other of said contacts, said inertia member having a predetermined rotational inertia for determining said interval, and means for driving said inertia member so that it moves from engagement with said one contact, allowing said one contact to move toward the other of said contacts for closing said electrical circuit, said latch being located in the path of movement of said inertia member whereby said member coacts with said latch for disengaging said latch from said impulse member and releasing the latter to deliver an impact to said blade.

6. The shutter of claim 5 wherein said switch comprises a substantially rigid arm mounted on said housing and insulated therefrom and a resilient arm mounted on said housing and grounded therein, said resilient arm being biased toward said rigid arm so as to contact the latter for completing the electrical circuit.

7. The shutter of claim 5 wherein said inertia member includes a cam portion adapted to coact with said one contact for moving said contact and opening said switch when said inertia member is moved into set position, and a striker portion adapted to engage said latch for moving said latch so as to release said impulse member.

8. A camera shutter comprising, in combination, a casing including an exposure aperture, a blade movably mounted on said casing and normally located in a position covering said aperture, an impulse member, means for driving said impulse member so as to deliver an impact to said blade to impart an aperture-uncovering movement to said blade, a latch for retaining said impulse member in a set position in readiness to deliver an impact to said blade, means providing an electrical flash lamp circuit including a switch having two contacts at least one of which is movable with respect to and is biased toward the other contact, a movable inertia member having a set position wherein said inertia member engages said one contact for retaining said one contact apart from the other of said contacts, said inertia member having a predetermined rotational inertia for determining said interval, means for driving said inertia member so that it moves from engagement with said one contact, allowing said one contact to move toward the other of said contacts, closing said electrical circuit, said latch being located in the path of movement of said inertia member whereby said member coacts with said latch for disengaging said latch from said impulse member and releasing the latter to deliver an impact to said blade, and means for simultaneously engaging and moving said impulse member into set position and moving said inertia member into set position against the bias of said one contact for opening said switch.

References Cited in the file of this patent

UNITED STATES PATENTS

| 2,355,825 | Schwarz | Aug. 15, 1944 |
| 2,439,417 | Castedello | Apr. 13, 1948 |
| 2,490,755 | Hutchison | Dec. 6, 1949 |
| 2,662,457 | Fairbank | Dec. 15, 1953 |